(12) United States Patent
Smith et al.

(10) Patent No.: US 10,703,465 B2
(45) Date of Patent: Jul. 7, 2020

(54) VIBRATION ISOLATION DEVICE MOUNTING SYSTEM

(71) Applicant: Bell Helicopter Textron Inc., Fort Worth, TX (US)

(72) Inventors: Michael Smith, Colleyville, TX (US); Maurice Griffin, Euless, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 347 days.

(21) Appl. No.: 15/942,030

(22) Filed: Mar. 30, 2018

(65) Prior Publication Data

US 2019/0300162 A1    Oct. 3, 2019

(51) Int. Cl.
*B64C 27/00* (2006.01)
*F16F 13/24* (2006.01)

(52) U.S. Cl.
CPC ............ *B64C 27/001* (2013.01); *F16F 13/24* (2013.01); *B64C 2027/002* (2013.01)

(58) Field of Classification Search
CPC ... B64C 27/001; B64C 2027/002; F16F 13/24
See application file for complete search history.

(56) References Cited

U.S. PATENT DOCUMENTS

| | | | |
|---|---|---|---|
| 4,403,681 A * | 9/1983 | Desjardins | B64C 27/001 188/379 |
| 8,672,262 B2 | 3/2014 | Griffin | |
| 8,888,079 B2 | 11/2014 | Smith et al. | |
| 9,249,856 B1 * | 2/2016 | Lee | F16F 13/24 |
| 9,279,741 B2 | 3/2016 | Bennett et al. | |
| 9,669,922 B2 | 6/2017 | Griffin | |
| 9,777,788 B2 | 10/2017 | Lee et al. | |
| 2002/0060268 A1 * | 5/2002 | Smith | F16F 15/027 244/54 |
| 2006/0261530 A1 * | 11/2006 | Stamps | F16F 9/52 267/140.11 |
| 2011/0259687 A1 * | 10/2011 | Smith | F16F 13/06 188/319.2 |
| 2013/0175389 A1 * | 7/2013 | Griffin | F16F 13/24 244/54 |
| 2013/0270415 A1 * | 10/2013 | Lee | B64C 27/001 248/638 |
| 2014/0064922 A1 * | 3/2014 | Smith | B64C 27/001 415/118 |
| 2018/0038439 A1 * | 2/2018 | Lee | F16F 13/24 |
| 2018/0348439 A1 | 12/2018 | Yamada | |

* cited by examiner

*Primary Examiner* — Rodney A Bonnette
(74) *Attorney, Agent, or Firm* — Daniel J. Chalker; Edwin S. Flores; Chalker Flores, LLP

(57) ABSTRACT

A mounting system for a vibration isolation device comprises a support structure having an opening disposed therein, the opening having a concave recess; a thin elastomeric component attached to a surface of the concave recess; and a spherical elastomeric bearing disposed in the opening and attached to the thin elastomeric component, the spherical elastomeric bearing having a beveled upper portion, a middle portion and a beveled lower portion configured to engage the vibration isolation devices.

32 Claims, 10 Drawing Sheets

VIBRATION ISOLATION DEVICE MOUNTING SYSTEM

CROSS-REFERENCE TO RELATED APPLICATIONS

This patent application is related to U.S. provisional patent application Ser. No. 62/399,067 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which are hereby incorporated by reference in their entirety.

STATEMENT OF FEDERALLY FUNDED RESEARCH

This application is not the subject of any federally sponsored research or development.

TECHNICAL FIELD OF THE INVENTION

The present invention relates in general to the field of vibration control, and more particularly, to a vibration isolation device mounting system.

BACKGROUND OF THE INVENTION

Without limiting the scope of the invention, its background is described in connection with vibration isolation devices for aircraft.

One example is U.S. Pat. No. 8,888,079, issued to Smith et al., entitled "Apparatus for Improved Vibration Isolation", which describes a vibration isolation device having an upper housing defining an upper fluid chamber, a lower housing defining a lower fluid chamber, a piston resiliently disposed within the upper housing and the lower housing, a tuning passage defined by the piston, for providing fluid communication between the upper fluid chamber and the lower fluid chamber, a tuning fluid disposed within the tuning passage, the upper fluid chamber, and the lower fluid chamber. A reservoir in fluid communication with the upper fluid chamber for providing pressurization control of the vibration isolation device. An expanded accumulator region for providing increased pressure retention during maintenance and operation of the vibration isolation device.

Another example is taught in U.S. Pat. No. 9,279,741, issued to Lee et al., entitled "Mechanically Optimized Liquid Inertia Vibration Eliminator and Aircraft Pylon System", which describes a vibration isolation device includes an upper housing and a lower housing; an upper reservoir housing defining an upper fluid chamber; a lower reservoir housing defining a lower fluid chamber; a piston spindle resiliently coupled to the upper housing with an upper elastomer member, the piston spindle being resiliently coupled to the lower housing with a lower elastomer member; an elongated portion having a tuning passage; and a tuning fluid disposed there within. The vibration isolation device cancels vibratory forces at an isolation frequency. The vibration isolation device is utilized in a pylon system for mounting a transmission in an aircraft. The vibration isolation device is located between a pylon structure and a roof structure. The isolator includes a spherical bearing assembly that is located near a waterline location of a rotational axis of a drive shaft.

Another example is taught in U.S. Pat. No. 9,669,922, issued to Griffin, entitled "Flow Restriction System for Regulating Dynamic Pressure Loss", which describes a vibration control system includes an outer housing, an inner housing carried within the outer housing, a fluid passage extending through the inner housing and in fluid communication with a first fluid reservoir and a second fluid reservoir on opposing sides of the inner housing, and a gas extraction system. The gas extraction system includes a gas reservoir in fluid communication with the first fluid reservoir, a removable cap secured to the outer housing, a lid removably attached to the cap, and a plurality of conduits extending through cap and lid and configured to provide fluid and gas communication between the first reservoir and the gas reservoir.

Another example is taught in U.S. Pat. No. 9,777,788, issued to Lee et al., entitled "Rotorcraft Vibration Suppression System in a Four Corner Pylon Mount Configuration", in which the vibration suppression system includes a vibration isolation device located in each corner in a four corner pylon mount structural assembly. The combination of four vibration isolation devices, two being forward of the transmission, and two being aft of the transmission, collectively are effective at isolating main rotor vertical shear, pitch moment, as well as roll moment induced vibrations. Each opposing pair of vibration isolation devices can efficiently react against the moment oscillations because the moment can be decomposed into two antagonistic vertical oscillations at each vibration isolation device. A pylon structure extends between a pair of vibration isolation devices thereby allowing the vibration isolation devices to be spaced a away from a vibrating body to provide increased control.

The foregoing patents are hereby incorporated by reference in their entirety.

SUMMARY OF THE INVENTION

In one embodiment, a mounting system for a vibration isolation device comprises: a support structure having an opening disposed therein, the opening having a concave recess; a thin elastomeric component attached to a surface of the concave recess; and a spherical elastomeric bearing disposed in the opening and attached to the thin elastomeric component, the spherical elastomeric bearing having a beveled upper portion, a middle portion and a beveled lower portion configured to engage the vibration isolation device. In one aspect, the thin elastomeric component comprises a thin layer of rubber bonded to the surface of the concave recess; or the support structure comprises a bipod mount. In another aspect, the thin elastomeric component is radially stiff but allows for angular misalignment. In another aspect, the mounting system further comprises a clevis coupled to the support structure for mounting an engine. In another aspect, the vibration isolation device comprises an upper housing and a lower housing, wherein the lower housing comprises a beveled upper portion and a lower portion; the beveled upper portion of the spherical elastomeric bearing and the beveled upper portion of the lower housing of the vibration isolation device are configured to engage one another; the middle portion of the spherical elastomeric bearing and the lower portion of the lower housing of the vibration isolation device are sized and configured to allow the lower portion of the lower housing of the vibration isolation device to be inserted into and slid through the spherical elastomeric bearing; and an attachment device secures the lower portion of the lower housing of the vibration isolation device to the spherical elastomeric bearing. In another aspect, the attachment device comprises: a cylindrical wedge disposed around the lower portion of the lower housing of the vibration isolation device and inserted between the beveled lower portion of the spherical elastomeric bearing and the lower portion of the lower housing of the vibration isolation device; a cylindrical flange coupled to the lower portion of the lower housing of the vibration isolation device below the cylindrical wedge; and a set of compression screws installed through holes in the cylindrical flange that engage the cylindrical wedge. In another aspect, there is a gap between the cylindrical flange and the cylindrical wedge, wherein a distance of the gap indicates whether the compression screws have been properly tightened. In another aspect, the compression screws are safety wired. In another aspect, one or more anti-rotation components are attached to the cylindrical flange that engages a bottom of the vibration isolation device.

In another embodiment, a vibration isolation system comprises: a vibration isolation device comprising an upper housing and a lower housing, wherein the lower housing comprises a beveled upper portion and a lower portion; a support structure having an opening disposed therein, the opening having a concave recess; a thin elastomeric component attached to a surface of the concave recess; a spherical elastomeric bearing disposed in the opening and attached to the thin elastomeric component, the spherical elastomeric bearing having a beveled upper portion, a middle portion and a beveled lower portion; the beveled upper portion of the spherical elastomeric bearing and the beveled upper portion of the lower housing of the vibration isolation device are configured to engage one another; the middle portion of the spherical elastomeric bearing and the lower portion of the lower housing of the vibration isolation device are sized and configured to allow the lower portion of the lower housing of the vibration isolation device to be inserted into and slid through the spherical elastomeric bearing; and an attachment device secures the lower portion of the lower housing of the vibration isolation device to the spherical elastomeric bearing. In another aspect, the thin elastomeric component comprises a thin layer of rubber bonded to the surface of the concave recess; or the support structure comprises a bipod mount. In another aspect, the thin elastomeric component is radially stiff but allows for angular misalignment. In another aspect, the attachment device comprises: a cylindrical wedge disposed around the lower portion of the lower housing of the vibration isolation device and inserted between the beveled lower portion of the spherical elastomeric bearing and the lower portion of the lower housing of the vibration isolation device; a cylindrical flange coupled to the lower portion of the lower housing of the vibration isolation device below the cylindrical wedge; and a set of compression screws installed through holes in the cylindrical flange that engage the cylindrical wedge. In another aspect, there is a gap between the cylindrical flange and the cylindrical wedge, wherein a distance of the gap indicates whether the compression screws have been properly tightened. In another aspect, the compression screws are safety wired. In another aspect, one or more anti-rotation components are attached to the cylindrical flange that engages a bottom of the vibration isolation device. In another aspect, the support structure is mounted on a roof beam; and the upper portion of the vibration isolation device is coupled to a pylon structure. In another aspect, a clevis is coupled to the support structure for mounting an engine.

In another embodiment, a vibration isolation system for a rotorcraft comprises: a first roof beam and a second roof beam coupled to an airframe of the rotorcraft; a forward cross member coupled to the first roof beam and the second roof beam; an aft cross member coupled to the first roof beam and the second roof beam; a first support structure coupled to the first roof beam in a forward position; a second support structure coupled to the first roof beam in an aft position; a third support structure coupled to the second roof beam in a forward position; a fourth support structure coupled to the second roof beam in an aft position; each support structure having an opening disposed therein, the opening having a concave recess, a thin elastomeric component attached to a surface of the concave recess, and a spherical elastomeric bearing disposed in the opening and attached to the thin elastomeric component, the spherical elastomeric bearing having a beveled upper portion, a middle portion and a beveled lower portion; a vibration isolation device for each support structure comprising an upper housing and a lower housing, wherein the lower housing comprises a beveled upper portion and a lower portion; wherein the beveled upper portion of the spherical elastomeric bearing and the beveled upper portion of the lower housing of the vibration isolation device are configured to engage one another; wherein the middle portion of the spherical elastomeric bearing and the lower portion of the lower housing of the vibration isolation device are sized and configured to allow the lower portion of the lower housing of the vibration isolation device to be inserted into and slid through the spherical elastomeric bearing; an attachment device that secures the lower portion of the lower housing of the vibration isolation device to the spherical elastomeric bearing; a first pylon structure coupled to each of the upper housing of the vibration isolation device for the first support structure and the second support structure; and a second pylon structure coupled to each of the upper housing of the vibration isolation device for the first support structure and the second support structure. In one aspect, the thin elastomeric component comprises a thin layer of rubber bonded to the surface of the concave recess; or the support structure comprises a bipod mount. In one aspect, the thin elastomeric component is radially stiff but allows for angular misalignment. In one aspect, the attachment device comprises: a cylindrical wedge disposed around the lower portion of the lower housing of the vibration isolation device and inserted between the beveled lower portion of the spherical elastomeric bearing and the lower portion of the lower housing of the vibration isolation device; a cylindrical flange coupled to the lower portion of the lower housing of the vibration isolation device below the cylindrical wedge; and a set of compression screws installed through holes in the cylindrical flange that engage the cylindrical wedge. In one aspect, there is a gap between the cylindrical flange and the cylindrical wedge, wherein a distance of the gap indicates whether the compression screws have been properly tightened. In one aspect, the compression screws are safety wired. In one aspect, one or more anti-rotation components are attached to the cylindrical flange that engages a bottom of the vibration isolation device. In one aspect, a clevis is coupled to each support structure for mounting one or more engines. In one aspect, a main rotor gearbox is coupled to the first pylon structure and the second pylon structure.

In another embodiment, a method of installing a vibration isolation device in a support structure comprises: providing the vibration isolation device comprising an upper housing and a lower housing, wherein the lower housing comprises a beveled upper portion and a lower portion; providing the support structure comprising an opening disposed therein, the opening having a concave recess, a thin elastomeric component attached to a surface of the concave recess, a spherical elastomeric bearing disposed in the opening and attached to the thin elastomeric component, the spherical elastomeric bearing having a beveled upper portion, a middle portion and a beveled lower portion; sliding the lower portion of the lower housing of the vibration isolation device through the spherical elastomeric bearing until the beveled upper portion of the spherical elastomeric bearing and the beveled upper portion of the lower housing of the vibration isolation device engage one another; and securing the lower portion of the lower housing of the vibration isolation device to the spherical elastomeric bearing using an attachment device. In one aspect, securing the lower portion of the lower housing of the vibration isolation device to the spherical elastomeric bearing using the attachment device comprises: positioning a cylindrical wedge around the lower portion of the lower housing of the vibration isolation device and inserting the cylindrical wedge between the beveled lower portion of the spherical elastomeric bearing and the lower portion of the lower housing of the vibration isolation device; attaching a cylindrical flange to the lower portion of the lower housing of the vibration isolation device below the cylindrical wedge; and installing a set of compression screws through holes in the cylindrical flange to engage the cylindrical wedge. In one aspect, the method further comprises determining whether the compression screws have been properly tightened based on a distance of a gap between the cylindrical flange and the cylindrical wedge. In one aspect, the method further comprises safety wiring the compression screws. In one aspect, the method further comprises attaching one or more anti-rotation components to the cylindrical flange that engage a bottom of the vibration isolation device.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
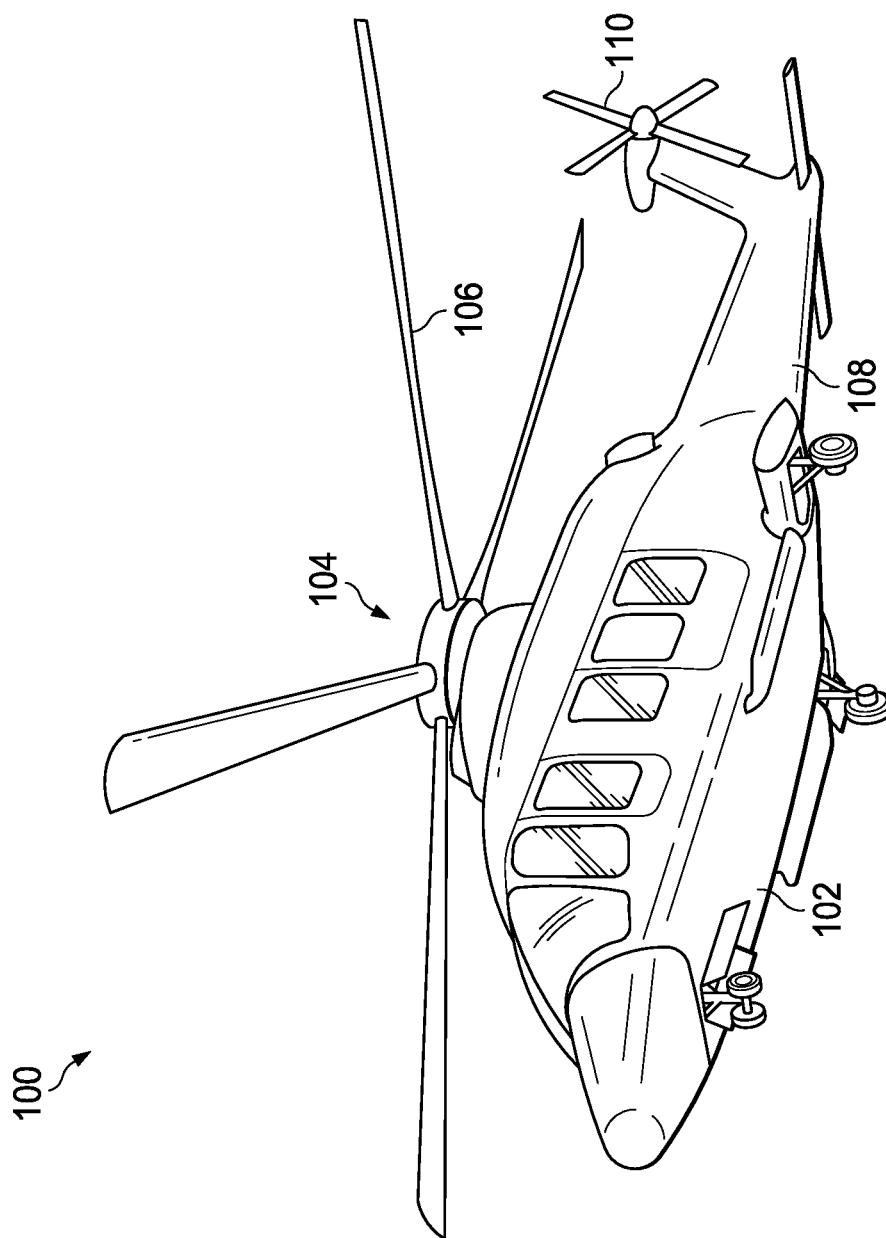
FIG. 1 shows a side view of a helicopter according to a preferred embodiment of the present application.

Now referring to FIG. 1, an aircraft 100 in accordance with a preferred embodiment of the present application is shown. In the exemplary embodiment, aircraft 100 is a helicopter having a fuselage 102 and a rotor system 104 carried thereon. A plurality of rotor blades 106 is operably associated with rotor system 104 for creating flight. A tail boom 108 is depicted that further includes tail rotor 110. The system of the present invention can be used in conjunction with an aircraft 100. Although shown associated with a helicopter, it will be appreciated that the mounting system of the present application can also be utilized with different types of aircraft and vehicles.

The present invention will now be described in reference to one example of a vibration isolation device. It will be appreciated that the mounting system of the present application can be used with other vibration isolation devices, including but not limited to, those described above in the background. Some external changes to the housings may be required.

Figure 2:
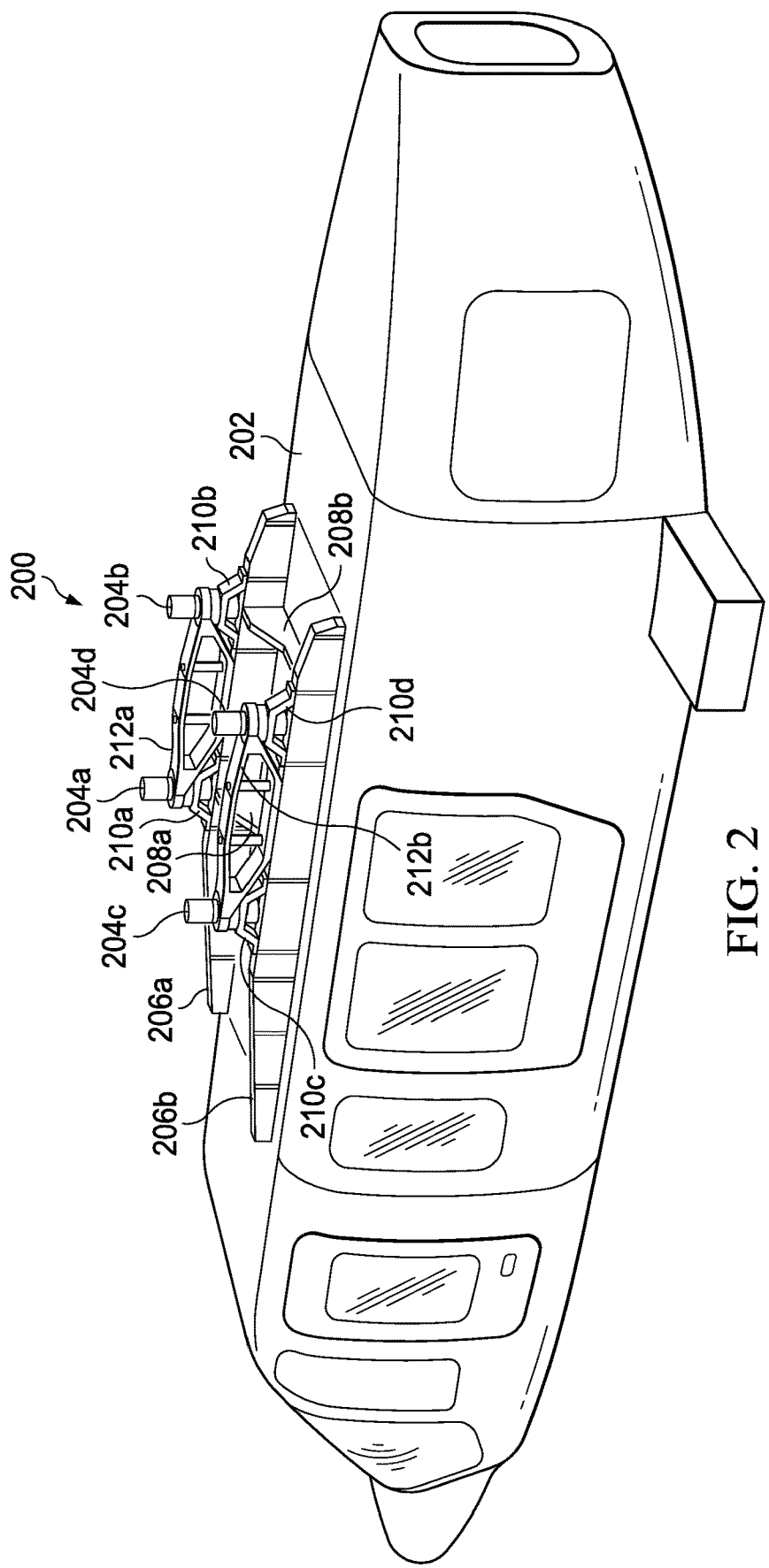
FIG. 2 shows a vibration suppression system for a helicopter according to an embodiment of the present application.
Figure 3:
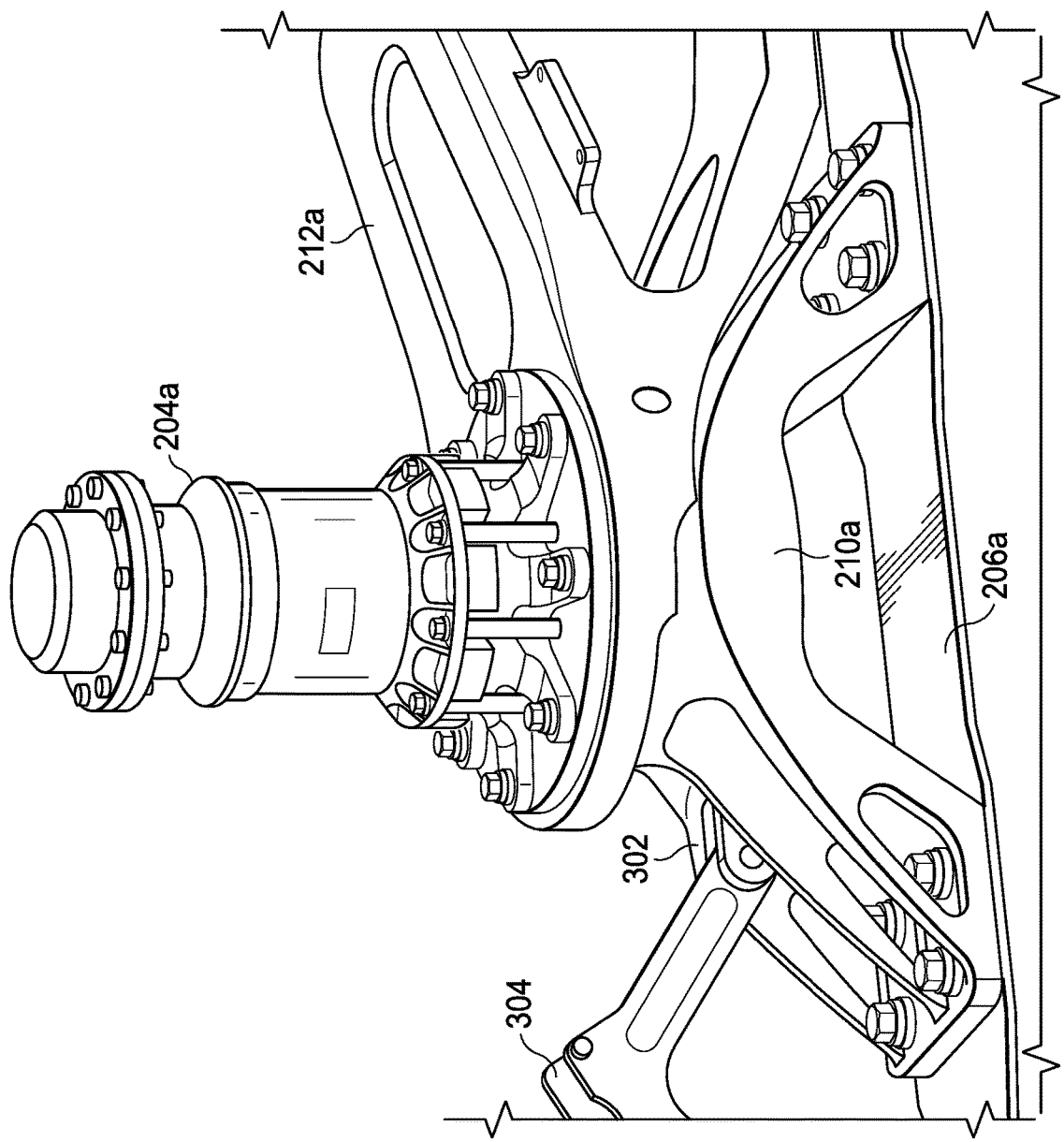
FIG. 3 shows a vibration isolation device mounted in a support structure according to an embodiment of the present application.

Referring now to FIGS. 2 and 3, a vibration suppression system 200 for aircraft 100 in accordance with one embodiment is shown along with a partial view of fuselage 102 with an exposed roof 202. The vibration suppression system 200 includes a vibration isolation device 204, also referred to as a vibration isolation device or vibration eliminator, located in each corner in a four-corner pylon mount structural assembly. The combination of four vibration isolation devices 204a-204d, two being forward of transmission or main rotor gearbox (MRGB) (not shown), and two being aft of the MRGB, collectively are effective at isolating main rotor vertical shear, pitch moment, as well as roll moment induced vibrations. For example, rotor hub induced pitch moment vibrations, which can become relatively large in high-speed forward flight, can be effectively isolated with the four vibration isolation devices 204a-204d in the corner arrangement.

The vibration suppression system 200 includes a first roof beam 206a, a second roof beam 206b, a forward cross member 208a, and an aft cross member 208b coupled to the airframe. Structural adapters can be used to structurally couple roof beams 206a and 206b with cross members 208a and 208b. Support structures 210a and 210b (hereinafter referred to as bipod mounts) are coupled to the first roof beam 206a, and bipod mounts 210c and 210d are coupled to the second roof beam 206b. First vibration isolation device 204a is coupled to the first bipod mount 210a using the mounting system described herein. Likewise, second vibration isolation device 204b is coupled to the second bipod mount 210b, third vibration isolation device 204c is coupled to the third bipod mount 210c, and fourth vibration isolation device 204d is coupled to the fourth bipod mount 210d, all using the mounting system described herein. First pylon structure 212a affixed to the MRGB is coupled to and extends between first vibration isolation device 204a and second vibration isolation device 204b. Similarly, second pylon structure 212b affixed to the MRGB is coupled to and extends between third vibration isolation device 204c and fourth vibration isolation device 204d. Each vibration isolation device 204a-204d is mounted substantially vertical. It should be appreciated that embodiments of vibration suppression system 200 may employ any practical number of engines and transmissions. Furthermore, it is contemplated that any plurality of pylon structures and vibration isolation devices may be used in a variety of orientations spaced fore, aft, and even inboard of the MRGB.

Pylon structures 212a, 212b are configured to correlate motion of the MRGB between a plurality of isolation devices 204a-204d simultaneously by suspending a portion of MRGB between the plurality of vibration isolation devices 204a-204d located on opposing ends of the pylon structures 212a-212b. The use of pylon structures 212a, 212b permits an aircraft to space the location of vibration isolation devices 204a-204d to an infinite number of locations independent of transmission or main rotor gearbox. Locating vibration isolation devices 204a-d forward and aft of MRGB minimizes the size of each vibration isolation device 204a-d and avoids the use of additional elements to control the dynamics of the MRGB. For example, the vibration suppression system 200 is springless in that the system 200 does not use a separate spring mounted externally beneath the MRGB to control dynamics of the MRGB. The vibration suppression system 200 is configured to control pitch and roll dynamics by spacing of vibration isolation devices 204a-204d and the use of pylon structures 212a and 212b. Bipod mounts 210a-210d include a clevis 302 that is used to mount the engine (not shown) via member 304. (see also FIG. 9).

Further, implementing active vibration isolation devices, such as piezoelectric vibration isolation devices, can be effective for vibration isolation for a multiple RPM rotorcraft. It should be appreciated that other active actuation methods can be used as well, such as hydraulic, electromagnetic, electromechanical, magnetohydrodynamic, to name a few. Active vibration isolation devices can also achieve better vibration isolation by overcoming damping losses, and adjusting the frequency response characteristics. Further, each opposing pair of vibration isolation devices 204a-204d can efficiently react against the moment oscillations because the moment can be decomposed into two antagonistic vertical oscillations at each vibration isolation device 204.

Figure 4:
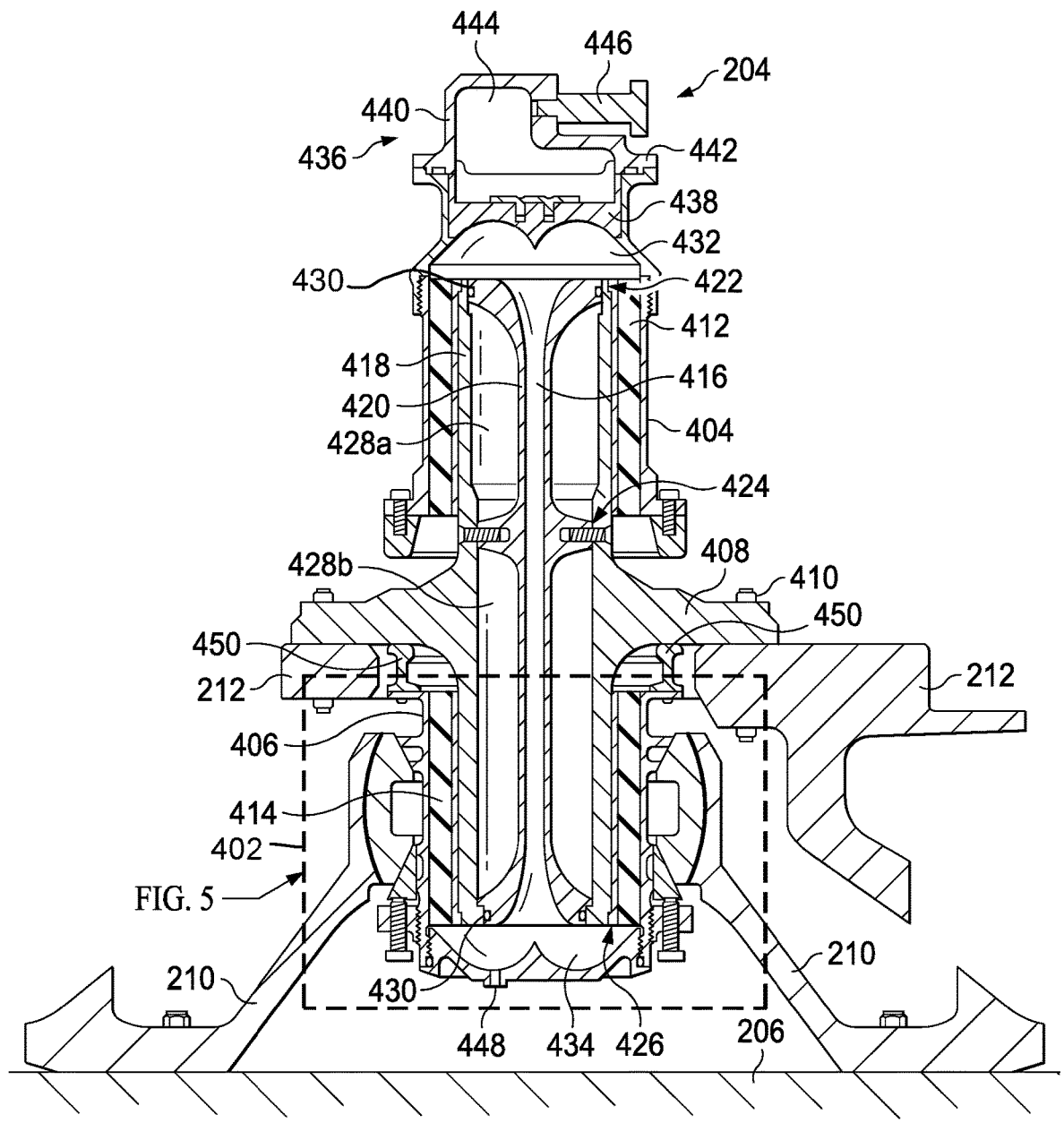
FIG. 4 shows a cross-sectional view of a vibration isolation device and mounting system in accordance with one embodiment of the present invention.
Figure 5:
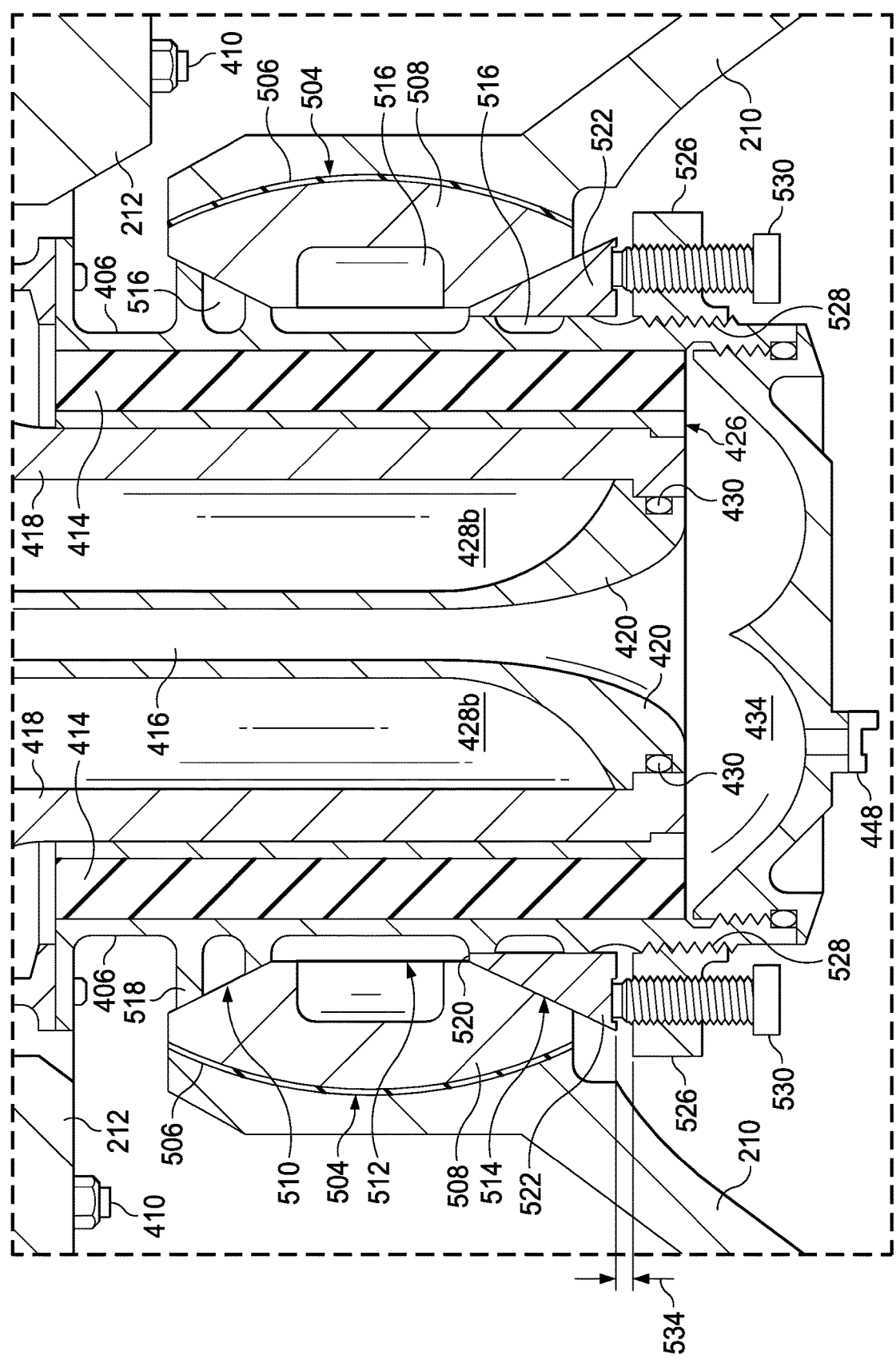
FIG. 5 shows a close up cross-sectional view of the lower portion of the vibration isolation device and mounting system in accordance with one embodiment of the present invention.
Figure 6:
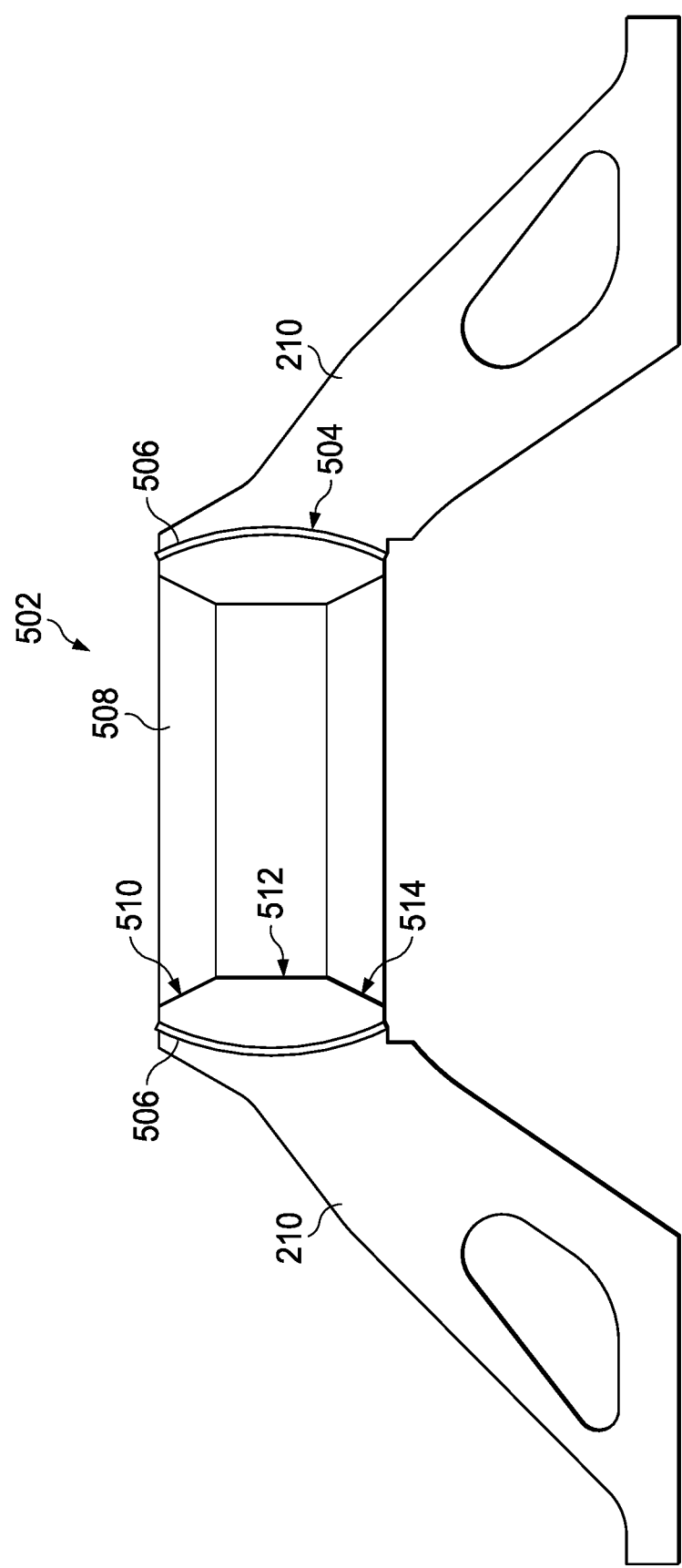
FIG. 6 shows a cross-sectional view of a bipod mount in accordance with one embodiment of the present invention.

Referring now to FIG. 4, a cross-sectional view of a vibration isolation device 204 and mounting system 402 in accordance with one embodiment is shown. As previously discussed, the bipod mount 210 is coupled to the roof beam 206, and the vibration isolation device 204 is coupled to the bipod mount 210 and the pylon structure 212. Vibration isolation device 204 comprises an upper housing 404 and a lower housing 406. A piston 408 is at least partially disposed within the interior of upper housing 404 and lower housing 406. Piston 408 is coupled to the pylon structure 212 (vibrating body) using studs 410. Lower housing 406 is coupled to the roof beam (body to be isolated from vibration) via vibration isolation device mounting system 402, which includes bipod mount 210. An upper elastomeric member 412 seals and resiliently locates piston 408 within the interior of upper housing 404. Similarly, a lower elastomeric member 414 seals and resiliently locates piston 408 within the interior of lower housing 406. Elastomeric members 412 and 414 function at least as a spring to permit piston 408 to move or oscillate relative to upper housing 404 and lower housing 406. When no load is applied, elastomeric members 412 and 414 are configured to locate piston 408 generally central to upper housing 404 and lower housing 406. The interior of piston 408 defines a generally elongated tuning passage 416. In this embodiment, the piston 408 comprises an exterior housing 418 and an interior housing 420 that are coupled together at an upper end 422, middle area 424, and lower end 426 to form hollow compartments or voids 428a and 428b. This piston 408 structure is lighter weight than prior art solid pistons. The upper and lower ends 422, 426 are sealed with O-rings 430. Other piston structures can be used as illustrated in the patents described in the background.

An upper fluid chamber 432 is generally defined by the interior of upper housing 404, piston 408, and upper elastomeric member 412. Similarly, a lower fluid chamber 434 is generally defined by the interior of lower housing 406, piston 408, and lower elastomeric member 414. Tuning passage 416 extends centrally through a longitudinal axis of piston 408, so that upper fluid chamber 432 and lower fluid chamber 434 are in fluid communication. A tuning fluid (not shown) is disposed in upper fluid chamber 432, lower fluid chamber 434, and tuning passage 416. Tuning fluid preferably has low viscosity, relatively high density, and non-corrosive properties. Introduction of an axial force into piston 408 translates piston 408 axially relative to upper housing 404 and lower housing 406. The movement of piston 408 forces tuning fluid to move through tuning passage 416 in a direction opposite to the translation direction of piston 408. Movement of tuning fluid produces an inertial force that cancels, or isolates, the force from piston 408 at a discrete frequency, i.e., isolation frequency. Stops 450 (e.g., hardened rubber, etc.) are attached to the top of the lower housing 406 to prevent the pylon structure 212 from contacting the bipod mount 210 when resting on the ground and allowing the pylon roll or pitch natural modes from moving up in frequency towards the main rotor blade passage frequency. The gaps are shown closed in FIG. 4, that is, the helicopter is on the ground with inadequate rotor thrust needed to lift the MRGP and piston 408 up from down stops 450.

The vibration isolation device 204 is pressurized (e.g., 100 psi, etc.). Since gas bubbles within the fluid can degrade the operational characteristics of the vibration isolation device 204 (e.g., cavitation a low temperatures and pressures, etc.), a gas extractor system 436 is configured to remove gas from upper fluid chamber 432. A cap 438 is removably attached to upper housing 404 and secured thereto via a lid 440. The lid 440 is fastened to upper housing 404 via a locking device 442, which could include a plurality of bolts and nuts. In some embodiments, the lid 440 is bonded to the upper housing 404. The lid 440 forms a gas reservoir 444 configured to receive and store the accumulated gas bubbles. The cap 438 has a plurality of conduits (not shown) that pass through the cap 438 and allow both fluid and gas bubbles to channel between the upper fluid chamber 432 and the gas reservoir 444. A valve 446 (e.g., Schrader valve, etc.) is installed in the lid 440. Although the valve 446 may be mounted vertically in some embodiments, it is preferred to mount it horizontally to reduce the likely hood of damage during maintenance. In some embodiments, a cover (not shown) is installed over the lid to provide additional protection. Prior to installation, the gas can be removed from the pressurized vibration isolation device 204 by inverting the device and opening the bleed/drain nut 448. Additional fluid can be added via valve 446 if necessary to achieve the desired pressure. This process can be repeated as necessary.

Now referring to FIGS. 4, 5, 6, 7A, 7B and 8, the mounting system 402 in accordance with one embodiment is shown. Bipod mount 210 has an opening or hole 502 disposed therein having a concave recess 504 and a thin elastomeric component 506, such as rubber, bonded to the surface of the concave recess 504. The thin elastomeric component 506 should be as thin as possible. Moreover, the thin elastomeric component 506 is under a high compression state and applies a preload on the bipod mount 210. The thin elastomeric component 506 is preferably very stiff radially, but allows for angular misalignment. A spherical elastomeric bearing 508 is attached to the thin elastomeric component 506 and has a beveled or tapered upper portion 510, a middle portion 512 and a beveled or tapered lower portion 514. Note that the recesses 516 shown in the lower housing 406 and spherical elastomeric bearing 508 reduce the weight of the system, but are not required.

Figure 7A:
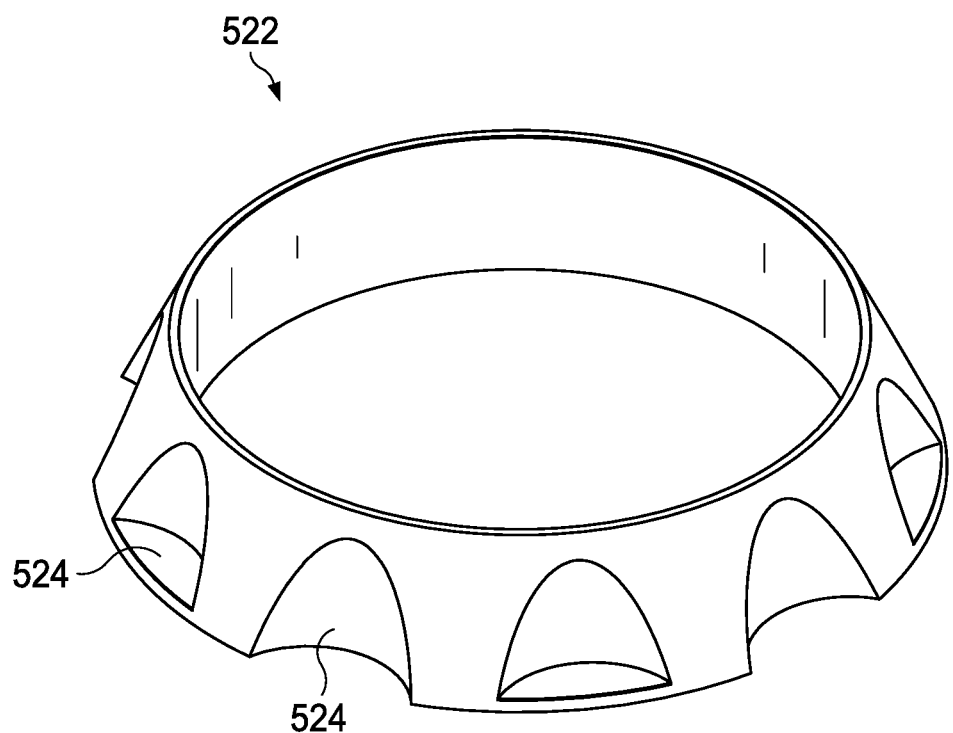
FIGS. 7A and 7B show perspective views of a cylindrical wedge in accordance with one embodiment of the present invention.
Figure 7B:
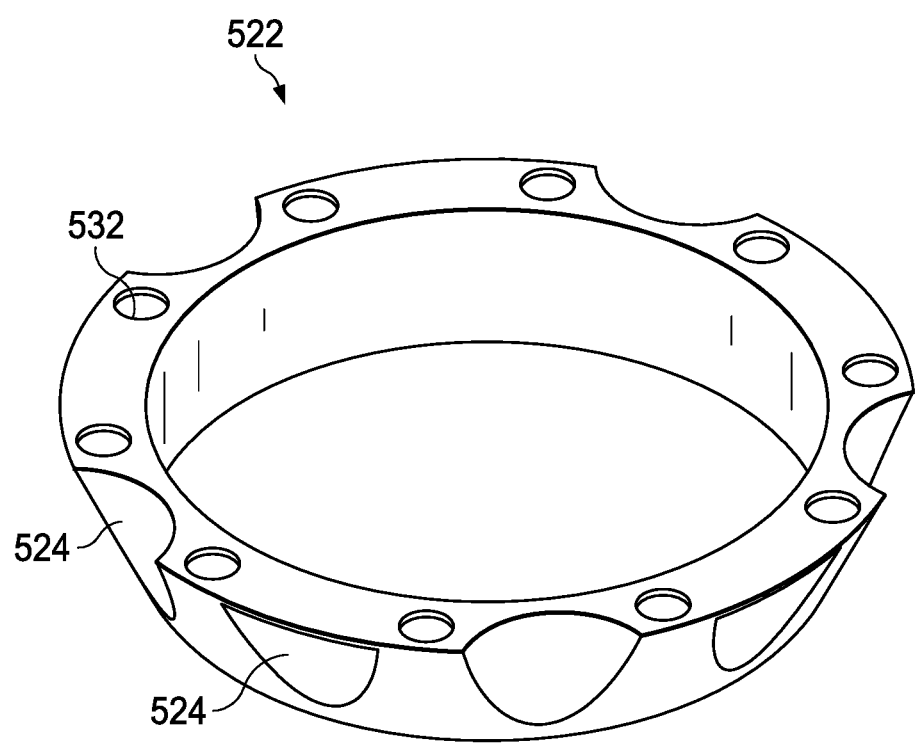
Figure 8:
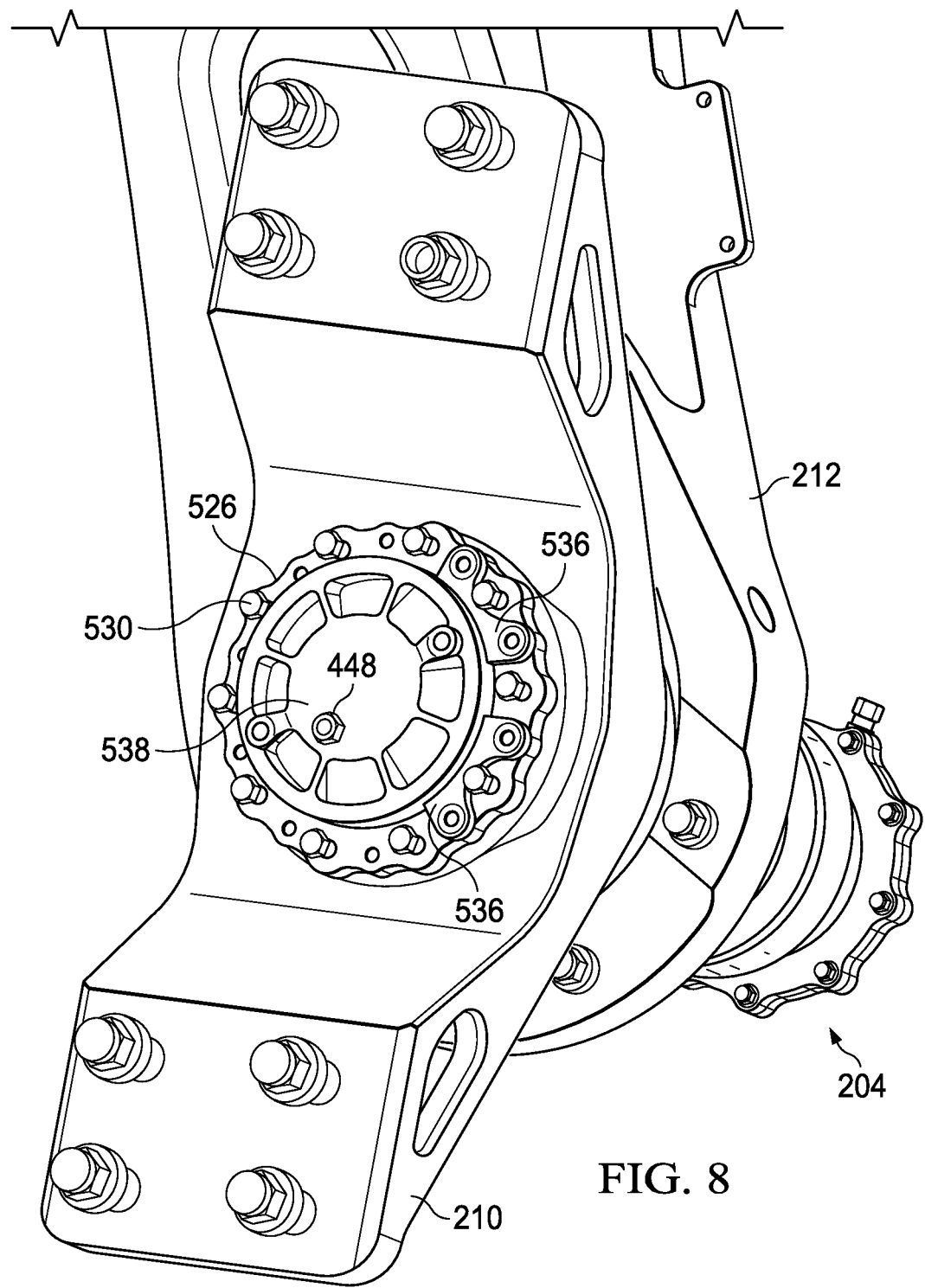
FIG. 8 shows a perspective view looking upward at the vibration isolation device and mounting system in accordance with one embodiment of the present invention.

The lower housing 406 has a beveled or tapered upper portion 518 and a lower portion 520. The beveled upper portion 510 of the spherical elastomeric bearing 508 is configured to receive and engage the beveled upper portion 518 of the lower housing 406. The middle portion of the spherical elastomeric bearing 508 and the lower portion 520 of the lower housing 406 are sized and configured to allow the lower portion 520 of the lower housing 406 to be inserted into and slid through the spherical elastomeric bearing 508. During installation, a cylindrical wedge, keystone or cone 522 is positioned around the lower portion 520 of the lower housing 406 and inserted into the space between the beveled lower portion 514 of the spherical elastomeric bearing 508 and the lower portion 520 of the lower housing 406. Isometric views of the cylindrical wedge 522 are shown in FIGS. 7A-7B. The recesses 524 reduce the weight of the cylindrical wedge 522, but are not required. Moreover, other shapes and designs for the cylindrical wedge 522 can be used, and the present invention is not limited to the specific shape shown in FIGS. 7A-7B. A cylindrical flange 526 is screwed onto the lower portion 520 of the lower housing 406 via threads 528. Compression screws 530 are installed through holes in the cylindrical flange 526 and engage set points 532 in the cylindrical wedge 522 to properly stress or "squeeze" the spherical elastomeric bearing 508. A gap 534 between the cylindrical flange 526 and the cylindrical wedge 522 can be used to determine whether the compression screws 530 have been properly tightened. The compression screws 530 can be safety wired so that they do not back off. Moreover, anti-rotation components 536 can be attached to the cylindrical flange 526 to engage the bottom 538 of the vibration isolation device 204. Note that other attachment devices can be used to secure the lower portion 520 of the lower housing 406 of the vibration isolation device 204 to the spherical elastomeric bearing 508.

Figure 9:
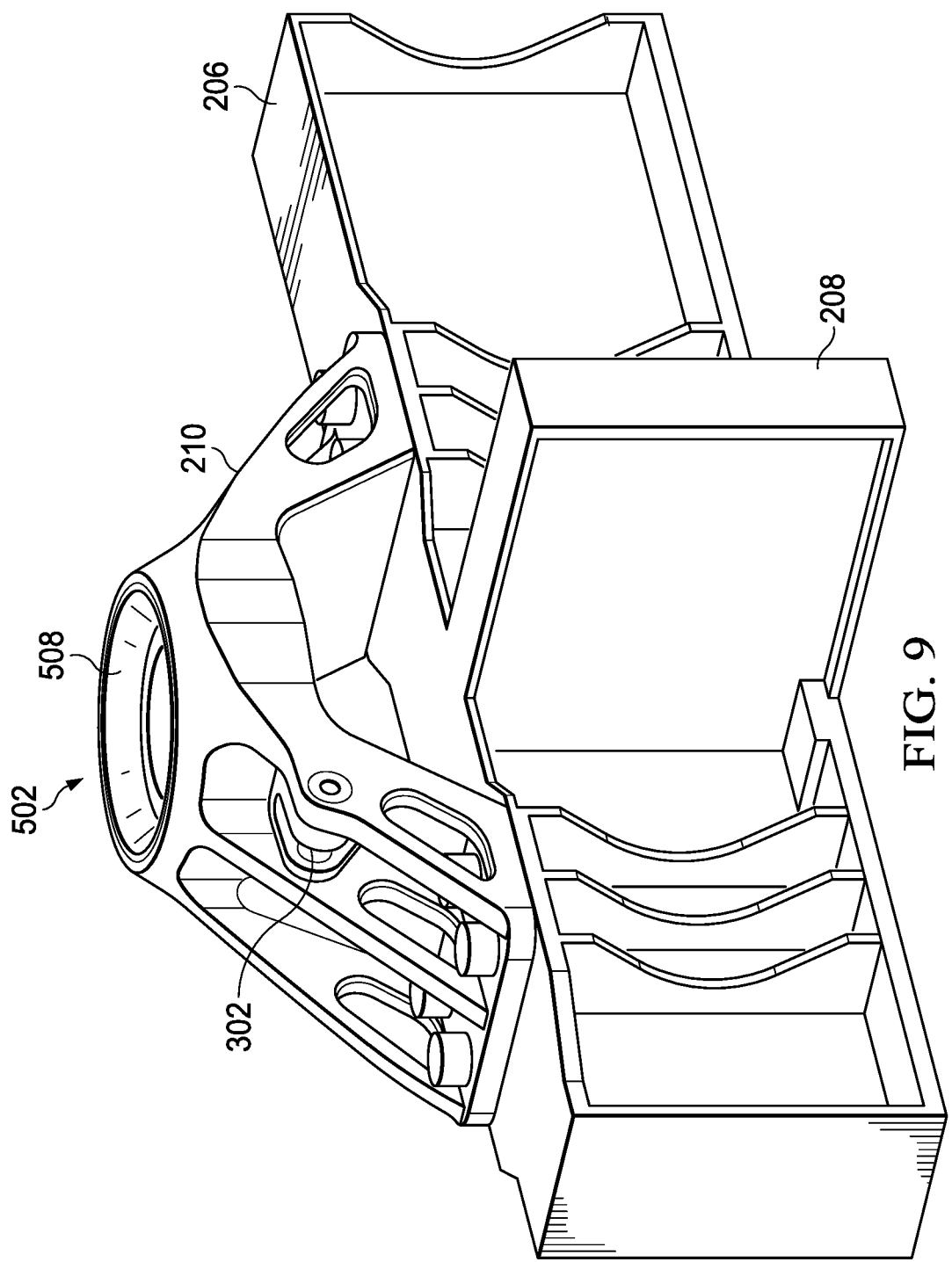
FIG. 9 shows a perspective view of the bipod mount and roof beam in accordance with one embodiment of the present invention.

Referring now to FIG. 9, the bipod mount 210 is shown coupled to the roof beam 206. The cross member 208 is coupled to the roof beam 206. Bipod mount 210 includes a clevis 302 that is used to mount the engine (not shown). The clevis 302 is coupled to, attached to or integrated into the bipod mount 210.

Figure 10:
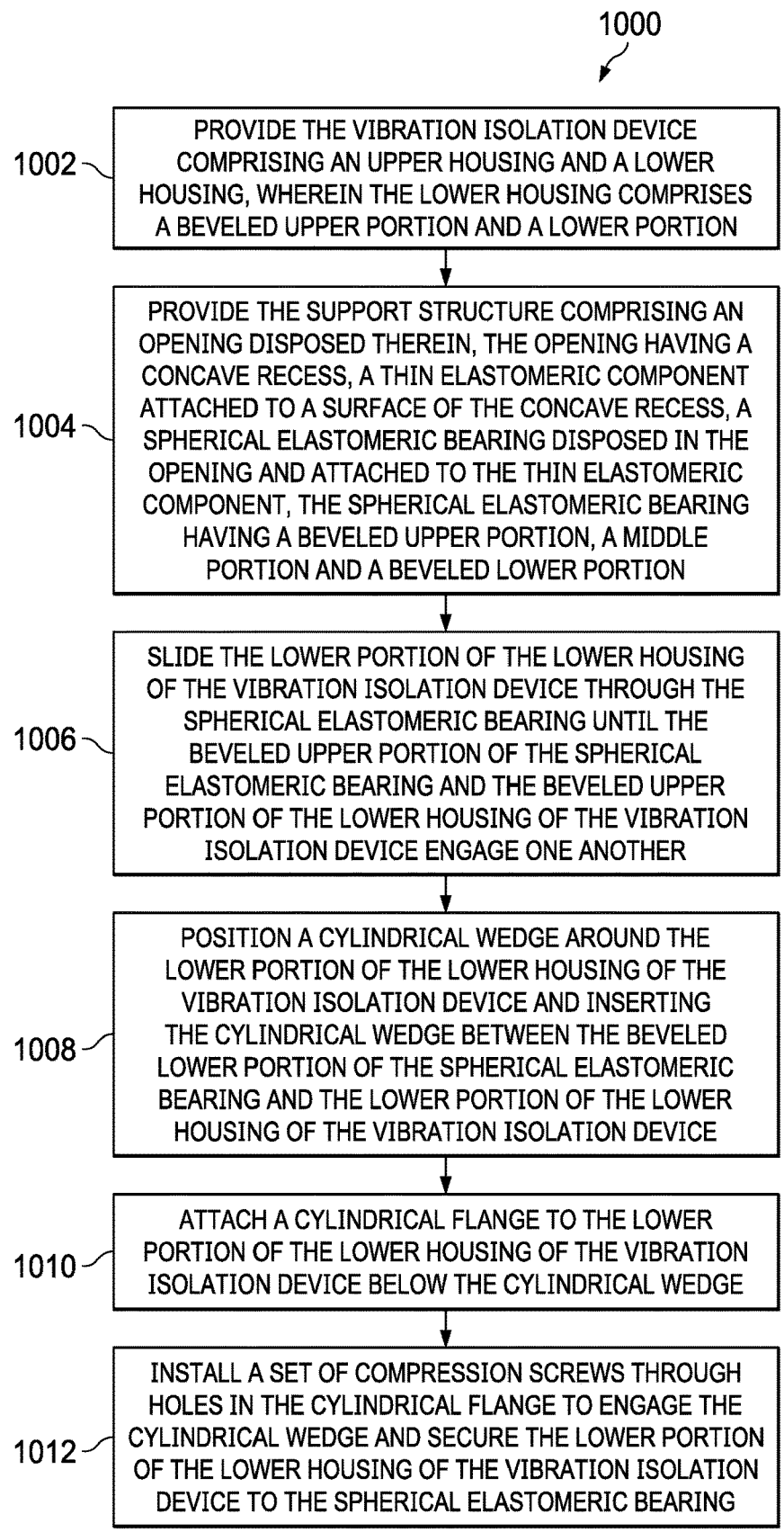
FIG. 10 shows a flowchart of a method for installing a vibration isolation device in a support structure in accordance with another embodiment of the present invention.

Now referring to FIG. 10, a flowchart of a method 1000 for installing a vibration isolation device in a support structure in accordance with another embodiment of the present invention is shown. The vibration isolation device is provided in block 1002. The vibration isolation device comprises an upper housing and a lower housing, wherein the lower housing comprises a beveled upper portion and a lower portion. The support structure in provided in block 1004. The support structure comprises an opening disposed therein, the opening having a concave recess, a thin elastomeric component attached to a surface of the concave recess, a spherical elastomeric bearing disposed in the opening and attached to the thin elastomeric component, the spherical elastomeric bearing having a beveled upper portion, a middle portion and a beveled lower portion. The lower portion of the lower housing of the vibration isolation device is slid through the spherical elastomeric bearing until the beveled upper portion of the spherical elastomeric bearing and the beveled upper portion of the lower housing of the vibration isolation device engage one another in block 1006. The lower portion of the lower housing of the vibration isolation device is secured to the spherical elastomeric bearing using an attachment device. In one embodiment, this is accomplished by positioning a cylindrical wedge around the lower portion of the lower housing of the vibration isolation device and inserting the cylindrical wedge between the beveled lower portion of the spherical elastomeric bearing and the lower portion of the lower housing of the vibration isolation device in block 1008; attaching a cylindrical flange to the lower portion of the lower housing of the vibration isolation device below the cylindrical wedge in block 1010; and installing a set of compression screws through holes in the cylindrical flange to engage the cylindrical wedge in block 1012. The method may also include determining whether the compression screws have been properly tightened based on a distance of a gap between the cylindrical flange and the cylindrical wedge; safety wiring the compression screws; and/or attaching one or more anti-rotation components to the cylindrical flange that engage a bottom of the vibration isolation device.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the fastener subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process step(s), or limitation(s)) only.

As used herein, the term "or combinations thereof" refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial," or "substantially," refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A mounting system for a vibration isolation device comprising:
    a support structure having an opening disposed therein, the opening having a concave recess;
    a thin elastomeric component attached to a surface of the concave recess; and
    a spherical elastomeric bearing disposed in the opening and attached to the thin elastomeric component, the spherical elastomeric bearing having a beveled upper portion, a middle portion and a beveled lower portion configured to engage the vibration isolation device.

2. The mounting system of claim 1, wherein:
    the thin elastomeric component comprises a thin layer of rubber bonded to the surface of the concave recess; or
    the support structure comprises a bipod mount.

3. The mounting system of claim 1, wherein the thin elastomeric component is radially stiff but allows for angular misalignment.

4. The mounting system of claim 1, further comprising a clevis coupled to the support structure for mounting an engine.

5. The mounting system of claim 1, wherein:
    the vibration isolation device comprises an upper housing and a lower housing, wherein the lower housing comprises a beveled upper portion and a lower portion;
    the beveled upper portion of the spherical elastomeric bearing and the beveled upper portion of the lower housing of the vibration isolation device are configured to engage one another;
    the middle portion of the spherical elastomeric bearing and the lower portion of the lower housing of the vibration isolation device are sized and configured to allow the lower portion of the lower housing of the vibration isolation device to be inserted into and slid through the spherical elastomeric bearing; and
    an attachment device secures the lower portion of the lower housing of the vibration isolation device to the spherical elastomeric bearing.

6. The mounting system of claim 5, wherein the attachment device comprises:
   a cylindrical wedge disposed around the lower portion of the lower housing of the vibration isolation device and inserted between the beveled lower portion of the spherical elastomeric bearing and the lower portion of the lower housing of the vibration isolation device;
   a cylindrical flange coupled to the lower portion of the lower housing of the vibration isolation device below the cylindrical wedge; and
   a set of compression screws installed through holes in the cylindrical flange that engage the cylindrical wedge.

7. The mounting system of claim 6, further comprising a gap between the cylindrical flange and the cylindrical wedge, wherein a distance of the gap indicates whether the compression screws have been properly tightened.

8. The mounting system of claim 6, wherein the compression screws are safety wired.

9. The mounting system of claim 6, further comprising one or more anti-rotation components attached to the cylindrical flange that engage a bottom of the vibration isolation device.

10. A vibration isolation system comprising:
    a vibration isolation device comprising an upper housing and a lower housing, wherein the lower housing comprises a beveled upper portion and a lower portion;
    a support structure having an opening disposed therein, the opening having a concave recess;
    a thin elastomeric component attached to a surface of the concave recess;
    a spherical elastomeric bearing disposed in the opening and attached to the thin elastomeric component, the spherical elastomeric bearing having a beveled upper portion, a middle portion and a beveled lower portion;
    the beveled upper portion of the spherical elastomeric bearing and the beveled upper portion of the lower housing of the vibration isolation device are configured to engage one another;
    the middle portion of the spherical elastomeric bearing and the lower portion of the lower housing of the vibration isolation device are sized and configured to allow the lower portion of the lower housing of the vibration isolation device to be inserted into and slid through the spherical elastomeric bearing; and
    an attachment device secures the lower portion of the lower housing of the vibration isolation device to the spherical elastomeric bearing.

11. The vibration isolation system of claim 10, wherein:
    the thin elastomeric component comprises a thin layer of rubber bonded to the surface of the concave recess; or
    the support structure comprises a bipod mount.

12. The vibration isolation system of claim 10, wherein the thin elastomeric component is radially stiff but allows for angular misalignment.

13. The vibration isolation system of claim 10, wherein the attachment device comprises:
    a cylindrical wedge disposed around the lower portion of the lower housing of the vibration isolation device and inserted between the beveled lower portion of the spherical elastomeric bearing and the lower portion of the lower housing of the vibration isolation device;
    a cylindrical flange coupled to the lower portion of the lower housing of the vibration isolation device below the cylindrical wedge; and
    a set of compression screws installed through holes in the cylindrical flange that engage the cylindrical wedge.

14. The vibration isolation system of claim 13, further comprising a gap between the cylindrical flange and the cylindrical wedge, wherein a distance of the gap indicates whether the compression screws have been properly tightened.

15. The vibration isolation system of claim 13, wherein the compression screws are safety wired.

16. The vibration isolation system of claim 13, further comprising one or more anti-rotation components attached to the cylindrical flange that engage a bottom of the vibration isolation device.

17. The vibration isolation system of claim 10, wherein:
    the support structure is mounted on a roof beam; and
    the upper portion of the vibration isolation device is coupled to a pylon structure.

18. The vibration isolation system of claim 10, further comprising a clevis coupled to the support structure for mounting an engine.

19. A vibration isolation system for a rotorcraft comprising:
    a first roof beam and a second roof beam coupled to an airframe of the rotorcraft;
    a forward cross member coupled to the first roof beam and the second roof beam;
    an aft cross member coupled to the first roof beam and the second roof beam;
    a first support structure coupled to the first roof beam in a forward position;
    a second support structure coupled to the first roof beam in an aft position;
    a third support structure coupled to the second roof beam in a forward position;
    a fourth support structure coupled to the second roof beam in an aft position;
    each support structure having an opening disposed therein, the opening having a concave recess, a thin elastomeric component attached to a surface of the concave recess, and a spherical elastomeric bearing disposed in the opening and attached to the thin elastomeric component, the spherical elastomeric bearing having a beveled upper portion, a middle portion and a beveled lower portion;
    a vibration isolation device for each support structure comprising an upper housing and a lower housing, wherein the lower housing comprises a beveled upper portion and a lower portion;
    wherein the beveled upper portion of the spherical elastomeric bearing and the beveled upper portion of the lower housing of the vibration isolation device are configured to engage one another;
    wherein the middle portion of the spherical elastomeric bearing and the lower portion of the lower housing of the vibration isolation device are sized and configured to allow the lower portion of the lower housing of the vibration isolation device to be inserted into and slid through the spherical elastomeric bearing;
    an attachment device secures the lower portion of the lower housing of the vibration isolation device to the spherical elastomeric bearing;
    a first pylon structure coupled to each of the upper housing of the vibration isolation device for the first support structure and the second support structure; and
    a second pylon structure coupled to each of the upper housing of the vibration isolation device for the first support structure and the second support structure.

20. The vibration isolation system of claim 19, wherein:
the thin elastomeric component comprises a thin layer of rubber bonded to the surface of the concave recess; or
the support structure comprises a bipod mount.

21. The vibration isolation system of claim 19, wherein the thin elastomeric component is radially stiff but allows for angular misalignment.

22. The vibration isolation system of claim 19, wherein the attachment device comprises:
a cylindrical wedge disposed around the lower portion of the lower housing of the vibration isolation device and inserted between the beveled lower portion of the spherical elastomeric bearing and the lower portion of the lower housing of the vibration isolation device;
a cylindrical flange coupled to the lower portion of the lower housing of the vibration isolation device below the cylindrical wedge; and
a set of compression screws installed through holes in the cylindrical flange that engage the cylindrical wedge.

23. The vibration isolation system of claim 22, further comprising a gap between the cylindrical flange and the cylindrical wedge, wherein a distance of the gap indicates whether the compression screws have been properly tightened.

24. The vibration isolation system of claim 22, wherein the compression screws are safety wired.

25. The vibration isolation system of claim 22, further comprising one or more anti-rotation components attached to the cylindrical flange that engage a bottom of the vibration isolation device.

26. The vibration isolation system of claim 19, further comprising a clevis coupled to each support structure for mounting one or more engines.

27. The vibration isolation system of claim 19, further comprising a main rotor gearbox coupled to the first pylon structure and the second pylon structure.

28. A method of installing a vibration isolation device in a support structure:
providing the vibration isolation device comprising an upper housing and a lower housing, wherein the lower housing comprises a beveled upper portion and a lower portion;
providing the support structure comprising an opening disposed therein, the opening having a concave recess, a thin elastomeric component attached to a surface of the concave recess, a spherical elastomeric bearing disposed in the opening and attached to the thin elastomeric component, the spherical elastomeric bearing having a beveled upper portion, a middle portion and a beveled lower portion;
sliding the lower portion of the lower housing of the vibration isolation device through the spherical elastomeric bearing until the beveled upper portion of the spherical elastomeric bearing and the beveled upper portion of the lower housing of the vibration isolation device engage one another; and
securing the lower portion of the lower housing of the vibration isolation device to the spherical elastomeric bearing using an attachment device.

29. The method of claim 28, wherein securing the lower portion of the lower housing of the vibration isolation device to the spherical elastomeric bearing using the attachment device comprises:
positioning a cylindrical wedge around the lower portion of the lower housing of the vibration isolation device and inserting the cylindrical wedge between the beveled lower portion of the spherical elastomeric bearing and the lower portion of the lower housing of the vibration isolation device;
attaching a cylindrical flange to the lower portion of the lower housing of the vibration isolation device below the cylindrical wedge; and
installing a set of compression screws through holes in the cylindrical flange to engage the cylindrical wedge.

30. The method of claim 28, further comprising determining whether the compression screws have been properly tightened based on a distance of a gap between the cylindrical flange and the cylindrical wedge.

31. The method of claim 28, further comprising safety wiring the compression screws.

32. The method of claim 28, further comprising attaching one or more anti-rotation components to the cylindrical flange that engage a bottom of the vibration isolation device.

* * * * *